Figure 1:
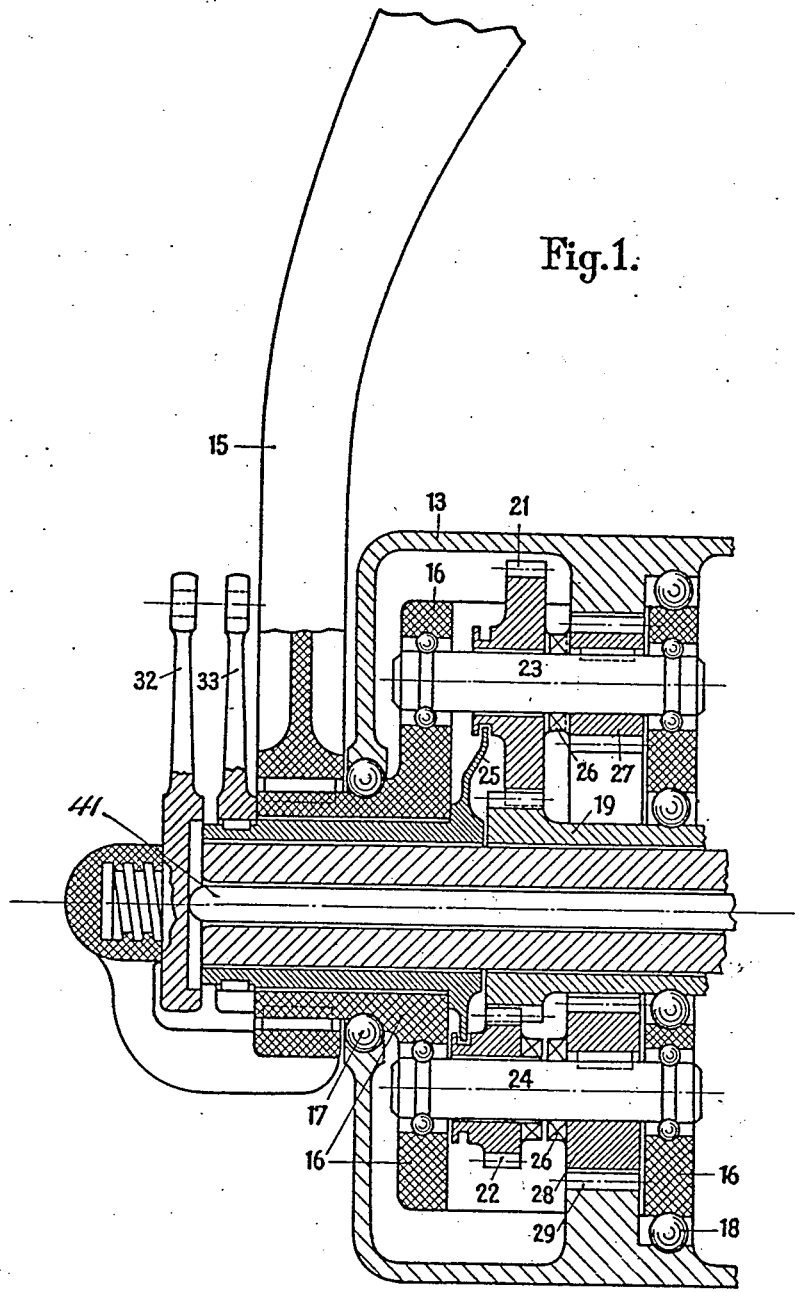
Figure 1A:
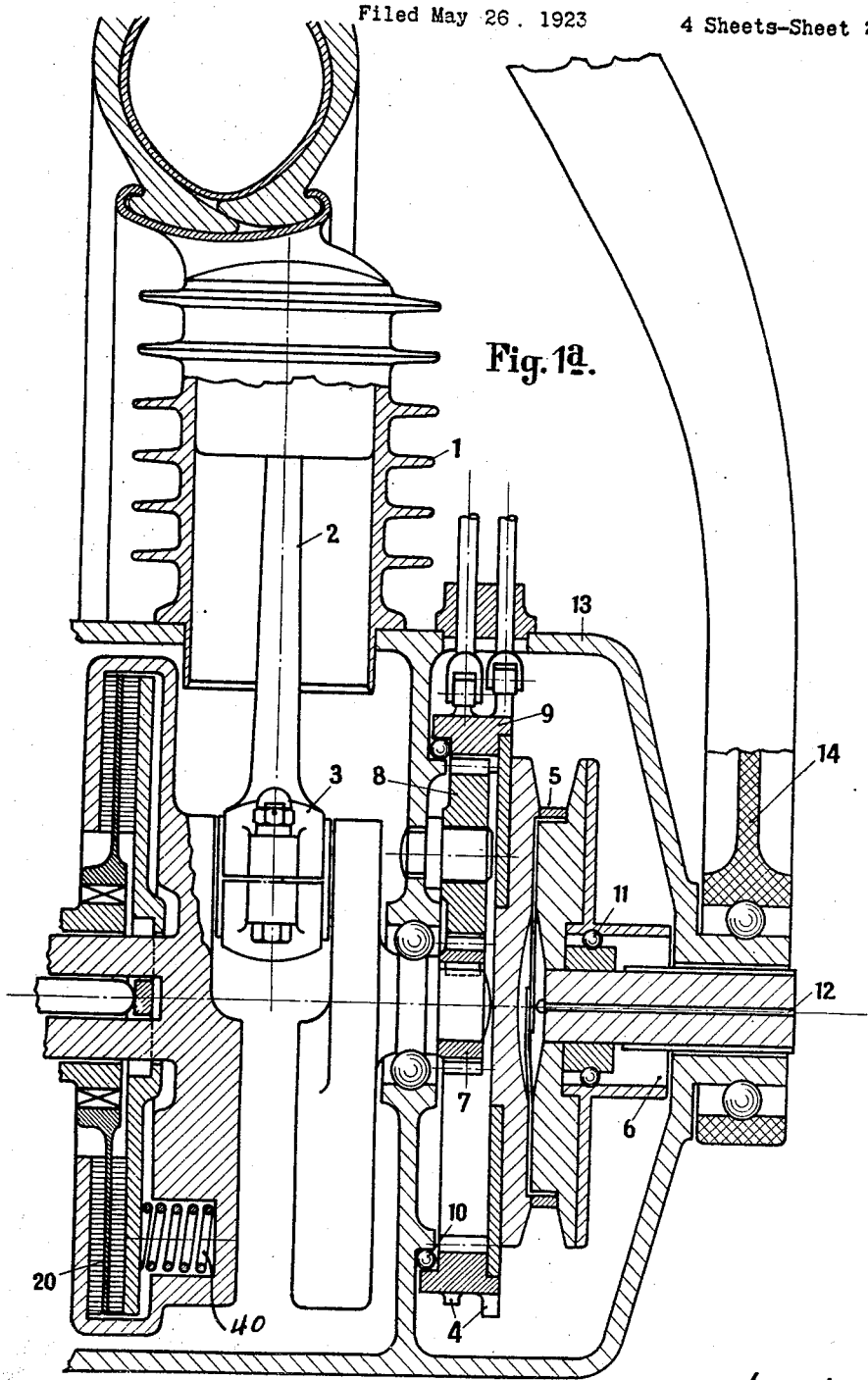

Oct. 21, 1924.  
E. L. MÜLLER  
1,512,232  
MOTOR DRIVE FOR MOTOR DRIVEN CONVEYANCES  
Filed May 26, 1923   4 Sheets-Sheet 3

Oct. 21, 1924.  
E. L. MÜLLER  
1,512,232  
MOTOR DRIVE FOR MOTOR DRIVEN CONVEYANCES  
Filed May 26, 1923  
4 Sheets-Sheet 4

Witnesses:

Inventor:

Patented Oct. 21, 1924.

1,512,232

UNITED STATES PATENT OFFICE.

EUGEN LUDWIG MÜLLER, OF MUNICH, GERMANY.

MOTOR DRIVE FOR MOTOR-DRIVEN CONVEYANCES.

Application filed May 26, 1923. Serial No. 641,779.

*To all whom it may concern:*

Be it known that I, EUGEN LUDWIG MÜLLER, residing at 36 Widenmayerstrasse, Munich, Germany, have invented certain new and useful Improvements in Motor Drives for Motor-Driven Conveyances, of which the following is a specification.

The invention relates in general to motors for motor driven conveyances and more particularly to internal combustion engines whose cylinders and central portion form the spokes and hub of a wheel. Both the crank shaft around which the cylinders are arranged and the cylinders themselves may rotate in the same or in opposite directions. The motor forming the subject of this invention may be used for driving motor driven cars in which the motor is positioned within the vehicle wheel. By placing the motor in one of the wheels the power transmitting devices ordinarily necessary for transmitting power from the motor to the wheels are dispensed with and space is thus saved in the body of the vehicle which may be used for other purposes. Motor driven cycles having motors arranged in the back or front wheel have already been built. But these machines, in spite of many advantages, have not as yet been capable of meeting the requirements of a modern power driven cycle because they could not be provided with a starting mechanism, coupling device and speed change and reversing gear. The obvious idea of providing a coupling between the slowly revolving engine casing and the rim of the wheel in which the motor is mounted led to impracticable designs. The problem to be solved is that, while retaining the fixed connection between the cylinders arranged like spokes in the wheel and the rim of the wheel, the engine shall be capable of executing any total number of revolutions without moving the vehicle as long as the motor is uncoupled, and when the motor is coupled it shall be capable of propelling the vehicle at different speeds.

A feature of the invention consists in the driving wheel which transmits motion from the crank shaft to the rim of the wheel being arranged so that it is normally loose on the crank shaft and is only coupled thereto so as to drive the speed change and reversing gear when the vehicle is to be set in motion. The valve control gear for the internal combustion engine is driven by a second driving wheel permanently fixed on the crank shaft, and therefore independent of the first driving wheel and the members driven by it.

The invention is illustrated in the drawing in which—

Figs. 1 and 1ª taken together show a cross section through an internal combustion engine forming part of a vehicle wheel or the like.

Figure 2:
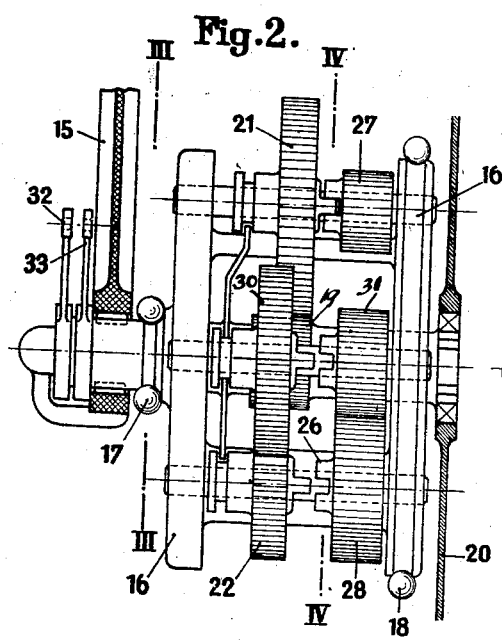
Figure 3:
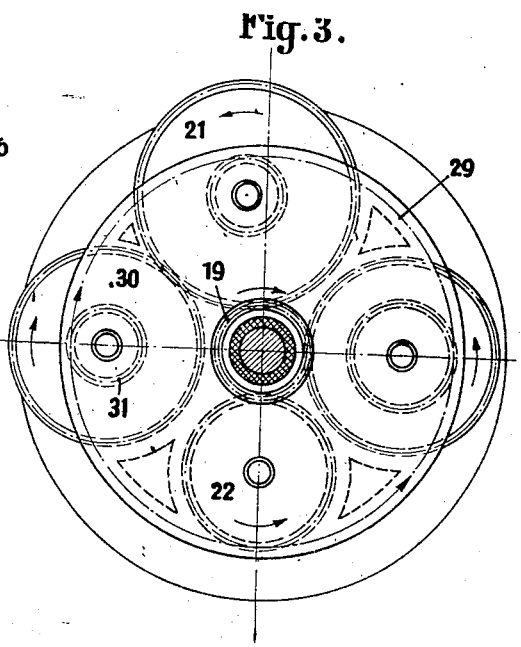
Figure 4:
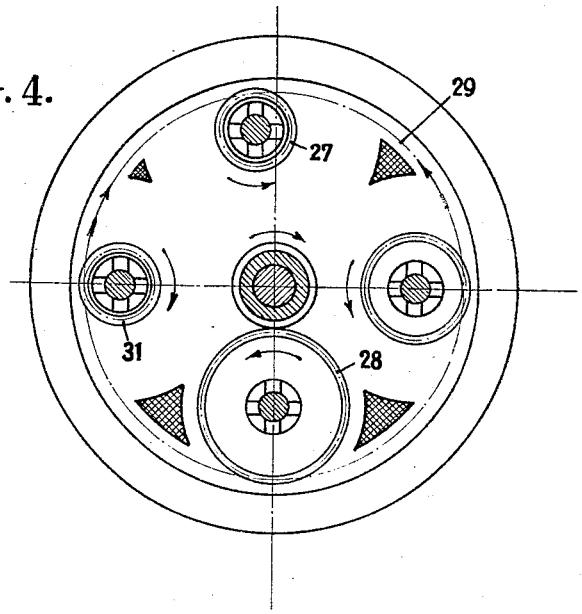

Figs. 2-5 illustrate the engine and details on a smaller scale, Fig. 2 being a side view of the speed change and reversing gear removed from the left hand chamber of the casing in Fig. 1; Fig. 3 a section on the line III—III of Fig. 2; Fig. 4 a section on the line IV—IV of Fig. 2; and Fig. 5 an end view of the valve controlling cams.

Figure 6:
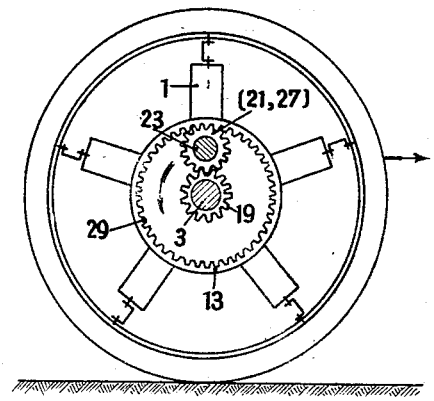

Fig. 6 is a simplified or diagrammatic representation of an engine according to the invention forming the spokes and hub of the front wheel of a bicycle or motor driven vehicle.

The mode of operation of the novel driving device or engine can be explained most simply with the aid of Fig. 6.

In this figure the cylinders 1 are rigidly connected to the felloe or rim. From this figure it is apparent that if the motor is to run while the wheel is stationary, the cylinders will have to remain stationary while the crank shaft revolves. Under these circumstances, which correspond to the no load operating condition of the engine, the crank shaft 3 exerts no force on the casing 13 because the toothed wheel or pinion 13 is mounted loosely on the crank shaft 3.

For the purposes of the following description it will be assumed that the crank shaft revolves counter clockwise at a speed of 3600 revolutions per minute, although of course the speed could be regulated in wide limits by adjusting the carburettor. On this assumption the engine casing and the wheel connected to it by the cylinders, would execute nought revolutions and the crank shaft 3600 revolutions per minute.

Suppose that the vehicle wheel is to be driven at a speed of 200 revolutions which, it will be assumed, corresponds to the first speed rate of the vehicle. It will be supposed further that the vehicle shall move in the direction indicated by the arrow at the right of the wheel. The rotation of the engine casing, and therefore the turning of the wheel in the desired direction, is brought about by the driving wheel 19, which is normally loose on the crank shaft 3, being firmly coupled thereto so that it transmits motion from the shaft 3 through the pinions 21 and 27 to the circle of internal teeth 29 fixed to the casing 13 of the engine. The motion transmitting pinions 21 and 27 are mounted on a pivot or shaft 23 fixed to the frame of the vehicle, say to the front fork of the bicycle. Under these circumstances the entire motor casing with its cylinders will revolve clockwise at a speed of 200 revolutions and hence the speed of the crank shaft relatively to the fixed pivot 23 or to the engine casing will be 3600—200=3400.

Figure 5:
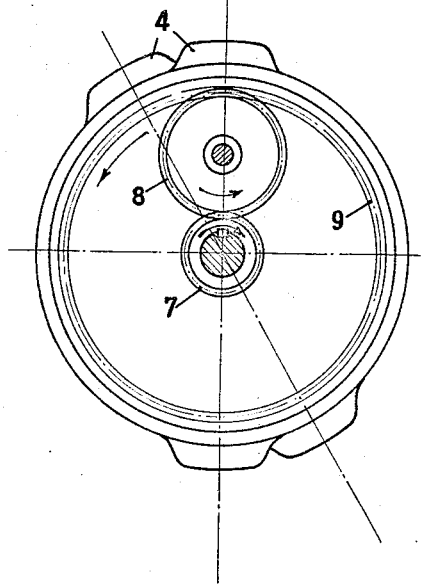

The general operation of the wheel engine having thus been explained, the operations of the details of the engine shown in Figs. 1–5 will now be described. In these figures 1 denotes the cylinders whose pistons act through connecting rod 2 on the crank 3. The valves (not shown) of the engine are controlled by cams 4 mounted on a ring 9 provided with an internal circle of teeth which is rotated with the aid of toothed wheels 7 and 8 which are in mesh with each other. The wheel 7 is keyed to the crank shaft as shown in Fig. 5 so as to always rotate with it. 5 is the high tension electric current distributor, and 6 a chamber adapted to receive the current interruptor (not shown). 10 and 11 are two ball bearings on which are journalled the parts by which the internal combustion processes in the cylinders are controlled, these parts comprising the ring 9 with its internal teeth and the external cams 4, and the high tension distributor 5 and the interrupter, and being enclosed in the casing 13. The high tension currents are conducted to the distributor by the conductor 12. The parts of the vehicle which are fixed relatively to its frame and in which the shaft 23 (see also Fig. 6) is journalled are recognizable in Figs. 1–4 by their being cross hatched. These fixed parts are the fork ends 14 and 15 and the fixed member 16 which is keyed to the end of the fork 15. The engine casing 13 which revolves round the fixed member 16 is journalled at the ball bearings 17 and 18.

Loosely mounted on the crank shaft is the toothed wheel 19. At its internal end the crank shaft carries or is formed with a flange provided with recesses in which there is a spring 40 that normally presses a longitudinally movable disk towards the left in Fig. 1. By means of a handle or lever 32 provided at its pivot with a screw that fits in an internal thread in the fixed or cross hatched member, a pin 41 which extends through the central bore of the crank shaft may be moved inwardly (to the right) or outwardly so that the spring pressed disk is caused to uncouple (or couple) the crank shaft from (or to) the disk 20 and hence to the wheel 19. The flange at the right end of the crank shaft also operates as a flying wheel.

It will be assumed that the toothed wheel 19 is coupled to the crank shaft and that the lowest speed of the speed change gear is thrown on. The wheel 19 which is in mesh with the wheel 21 will then rotate the latter which is revolubly mounted on the shaft 23 that is journalled in the fixed member 16. The gear wheel 21 will be in engagement through the clutch 26 with the wheel 27 that is keyed to the shaft 23 and meshes with the internal teeth 29 formed in the casing 13. By means of a cam disk 25 adapted to be rotated by a lever 33 the various coupling wheels such as 21, 22 can be moved in succession towards the right, that is into engagement with the respective wheels 27, 28 so as to give various rates of speed. From Fig. 1 it will be apparent that, on the cam 25 being turned through 180°, the coupling wheel 21 will be thrown out of engagement with its coaxial wheel 27, while the coupling wheel 22 will be thrown into engagement with its associated toothed wheel 28. According to the position in which the cam 25 is turned the various wheels shown in Fig. 3 will be thrown into or out of engagement.

The motion of the driven member or rim is reversed by throwing the toothed wheel 30 into engagement with the toothed wheel 31. Rotary motion is then transmitted from the wheel 19 to 21 and thence through 30 and 31 to the internal teeth 29 so that the ring of internal teeth 29 revolves in the same direction as the wheel mounted on the crank shaft.

Although the invetnion is described in the form of a motor mounted in a vehicle wheel it will be apparent that many changes may be made without departing from the scope of the invention; for the engine may also be used for driving the driven members of a vehicle, aircraft or any conveyance by means of separate motion transmitting gear as by chains, gear wheels etc. moved by a driving wheel mounted on the revolving casing of the engine.

I claim:—

1. In a machine of the kind described a wheel rim, engine cylinders fixed to the said rim, a crank shaft in the middle of the said rim, pistons in the cylinders for driving the crank shaft, a driving wheel normally loose on the crank shaft, coupling means for coupling the driving wheel to the crank shaft, and motion transmitting wheels for transmitting motion from the driving wheel to the said rim.

2. In a machine of the kind described, a wheel rim, internal combustion engine cylinders fixed to the said rim, a crank shaft in the middle of the said rim, pistons in the cylinders for driving the crank shaft, a driving wheel normally loose on the crank shaft, valve control gear for the internal combustion engine, a second driving wheel permanently fixed on the crank shaft for driving the valve control gear, coupling means for coupling the driving wheel to the crank shaft, and motion transmitting wheels for transmitting motion from the driving wheel to the said rim.

3. In a machine of the kind described a wheel rim, engine cylinders fixed to the said rim, a crank shaft in the middle of the said rim, pistons in the cylinders for driving the crank shaft, a driving wheel normally loose on the crank shaft, coupling means for coupling the driving wheel to the crank shaft, and speed change motion transmitting wheels for transmitting motion from the driving wheel to the said rim.

4. In a machine of the kind described, a frame, a wheel rim, internal combustion engine cylinders fixed to the said rim, a crank shaft in the middle of the said rim and journalled in the said frame, pistons in the cylinders for driving the crank shaft, a driving wheel normally loose on the crank shaft, coupling means for coupling the driving wheel to the crank shaft, and motion transmitting wheels for transmitting motion from the driving wheel to the said rim, said motion transmitting wheels being journalled in the said frame.

5. In a machine of the kind described, a frame, a wheel rim, internal combustion engine cylinders fixed to the said rim, a crank shaft in the middle of the said rim and journalled in the said frame, pistons in the cylinders for driving the crank shaft, a driving wheel normally loose on the crank shaft, valve control gear for the internal combustion engine, a second driving wheel permanently fixed on the crank shaft for driving the valve control gear, coupling means for coupling the driving wheel to the crank shaft, and motion transmitting wheels for transmitting motion from the driving wheel to the said rim, said motion transmitting wheels being journalled in the said frame.

In testimony whereof I affix my signature in presence of a witness.

EUGEN LUDWIG MÜLLER.

Witness:
E. HOLTZERMANN.